July 10, 1956 P. P. METZ 2,753,586
CASTER
Filed March 29, 1954
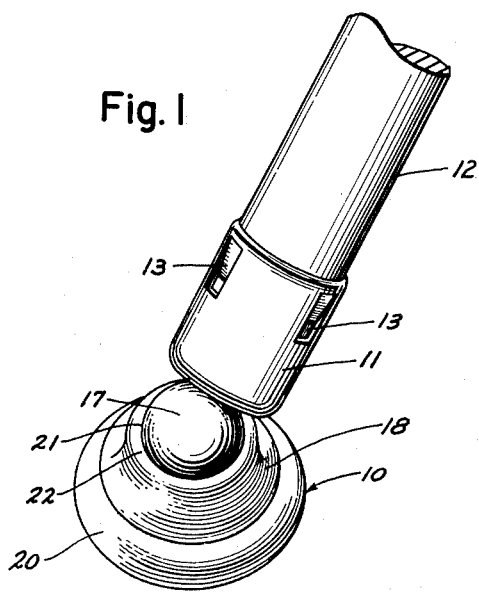
Fig. 1
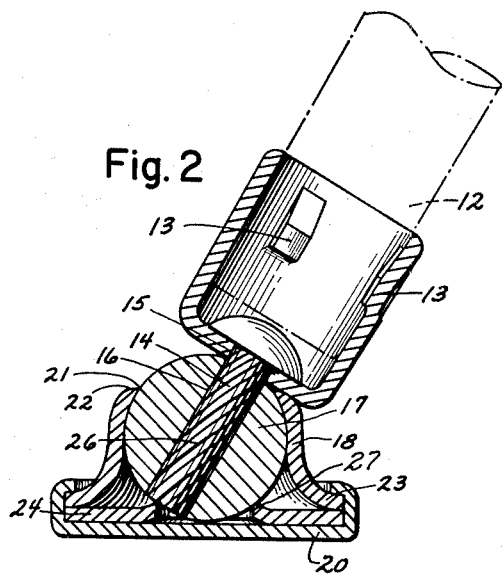
Fig. 2
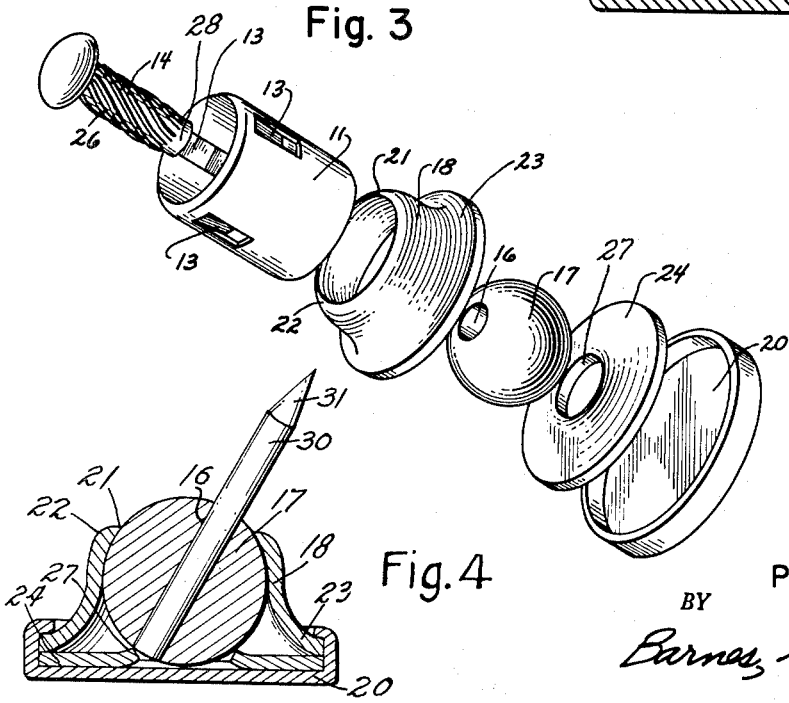
Fig. 3
Fig. 4
INVENTOR.
Peter P. Metz
BY
Barnes, Keof and Secrest

United States Patent Office 2,753,586
Patented July 10, 1956

2,753,586

CASTER

Peter P. Metz, Seattle, Wash., assignor to F. S. Harmon Manufacturing Co., Tacoma, Wash., a corporation of Washington Application March 29, 1954, Serial No. 419,170

5 Claims. (Cl. 16—18)

This invention relates to glide-type casters for use on the lower ends of furniture legs, and particularly glide-type casters in which the glide base is made universally adjustable in respect of the head which attaches to the leg, thus making the caster adaptable for use with furniture legs which are inclined from the vertical. This type of leg is quite common in functional furniture, wrought iron furniture in particular, which is so widely used in the furnishing of modern homes. A principal objection to previously existing casters of this type is that the base portions admit to only a very moderate pivotal movement and hence do not adapt themselves to all furniture designs, some of which have their legs sloped to inclinations approaching 90°.

Recognizing the deficiencies of glide-type casters as they have been heretofore known, an object of my invention is the provision of a sliding caster which provides a comparatively large and substantially flat bearing member for maximum stability and which is so designed as to give to this bearing member a substantial universal action enabling the member to adapt itself to both upright and tilted legs with an assured firm engagement as between the bearing member and the floor.

A still additional object of my invention is the teaching of a method of producing a sturdy caster capable of being applied with ease and expedition to a furniture leg, and which may be fabricated and assembled at nominal cost.

With the foregoing and other still more particular objects and advantages in view, and which will appear and be understood in the course of the following description and claims, the invention consists in the novel construction and in the adaptation, arrangement and combination of parts hereinafter described and claimed.

In the accompanying drawing:

Figure 1 is a perspective view illustrating a sliding caster constructed in accordance with the preferred embodiment of the present invention and shown attached to the end of a furniture leg.

Fig. 2, drawn to an enlarged scale, is a longitudinal vertical cross-sectional view of the sliding caster;

Fig. 3 is an exploded view of the several elements composing my improved caster; and Fig. 4 is a longitudinal vertical cross-sectional view of a preferred form of another caster.

Referring to said drawing it is seen that my sliding caster includes a ferrule 11 which attaches over the end of a furniture leg 12 and such, for example, as the wrought iron leg of a chair, sofa, or table. On the cylindrical wall of this ferrule are inwardly struck spring teeth 13 which produce a yielding grip upon the leg when the ferrule is forced onto the latter. A headed stem 14 connects the ferrule 11 with a ball 17 by extending through an opening 15 in the base of the ferrule and thence into a through center-bore 16 provided in said ball. This stem is held in the bore by a pressed fit which will be hereinafter described in greater detail. This ball is socketed within a bell member 18. Clinched, with an intervening washer 24, to the basal flange 23 of this bell member so as to produce a housing enclosing the ball is an annular flat shoe plate 20. The bell member is open at the top to permit a moderate protrusion of the housed ball. As can be seen from the drawing the shoulder 22 which surrounds said top opening is tapered in a manner permitting the ball to rotate through the comparatively wide angle of approximately 30° in all directions from the vertical. Said bell member establishes a sufficiently tight grip upon the ball to yieldingly hold the ball in any given universal setting. The washer 24 acts as a step-bearing taking the vertical thrust imposed from the furniture leg 12 upon the ball 17, and I find that it is desirable to give to the washer an embossing draw treatment creating a raised seating lip 27 reducing the bearing surface between the ball and its step to a substantial line contact and at the same time elevating the ball for assured clearance relative to the shoe plate.

The base of the ferrule is held tightly against the ball by the stem 14 which, as before stated, is given a press fit within the ball. On the stem and spiralling lengthwise thereof are external ribs 26 which originate from a smooth terminal neck 28 and whose outside diameter is very slightly larger than the diameter of the center bore. The act of press-fitting the stem in the ball swages these ribs while lightly scoring the bore and this positively locks the stem to the ball. The length of the stem is such that the terminal neck 28 protrudes beyond the ball, and after application of the stem to the ball such protruding portion is removed by grinding down the stem flush with the ball. The ball will have been socketed in the bell member before such application of the stem, and the washer and shoe plate are thereupon brought into the assembly to complete the caster, or glide as it is commonly called where the bearing is flat.

Another preferred form of the caster is one having a stem 30 instead of a ferrule for attaching the caster to the base of the leg. This stem may be a rod having smooth walls or be screw-threaded, or even in the form of a nail with a tapered tip 31 for driving into the leg. In an embodiment of the caster one end of the stem is held in the center-bore of the ball 17 by a friction fit and the other end extends out of the ball and through the opening in the bell member. In attaching to the leg this caster is fitted onto the base of the leg by, preferably, tapping the leg and forcing or screwing the stem in this opening. However, if the stem has a tapered end like a nail the caster can also be attached by driving the stem into the base of the leg.

The advantages of the invention will, it is thought have been clearly understood from the foregoing detailed description of the embodiment which I have elected to illustrate. Minor changes in the details of construction will suggest themselves and may be resorted to without departing from the spirit of the invention, wherefore it is my intention that no limitations be implied and that the hereto annexed claims be given a scope fully commensurate with the broadest interpretation to which the employed language admits.

What I claim, is:

1. A glide-type caster comprising a ferrule having an opening in the base, a ball, said ball having a center-bore, a headed stem fixedly received in a center-bore of the ball to connect the ferrule to the ball, a bell member provided with a flaring mouth, the bell member having the ball socketed therein and providing an opening in the top through which a part of the ball and the headed end of the stem protrude, a tapered shoulder surrounding the opening in said bell member to permit the ball and the stem to move through a large vertical angle, a shoe having a flat bearing surface and a circumscribing flange, a washer between the shoe and the bell member, said ball bearing against the washer, and the upper part of said circumscribing flange being clinched over the flared mouth of the bell member to contain the washer and the ball and to form the glide surface for the caster.

2. A glide-type caster comprising a ferrule having an opening in the base and spring-teeth in the cylindrical wall to prevent the falling off of the caster from the furniture leg, a ball, said ball having a center-bore, a headed stem fixedly received in the center bore of the ball, a bell member provided with a flaring mouth, the bell member having the ball socketed therein and providing an opening in the top through which a part of the ball and the headed end of the stem protrude, a gently-sloping shoulder surrounding the opening in said bell member to permit the ball and the stem to move through a large vertical angle, a shoe having a flat bearing surface and a circumscribing flange, an embossed washer between the shoe and the bell member, said raised portion of the washer pointing toward the bell member and forming a seat for the ball, and the upper part of said circumscribing flange being clinched over the flared mouth of the bell member to contain the washer and the ball and to form the glide surface for the caster.

3. A glide-type caster comprising a ball having a stem rigid therewith and extending radially therefrom, a bell member provided with a flaring mouth, the bell member having the ball socketed therein and providing an opening in the top smaller in diameter than the diameter of the ball and through which a part of the ball and the other end of the stem protrude, said opening allowing the ball to partake of universal motion in the socket of the bell member, and a shoe having a flat bearing surface and a circumscribing flange, an embossed washer between the shoe and the bell member, said raised portion of the washer pointing toward the bell member and forming a seat for the ball, and said flange being clinched over the flared mouth of said bell member to retain the ball in the socket and form the glide base for the caster.

4. A glide-type caster comprising a ball having a center-bore, a stem having a ridge on the outer contacting surface, the stem positioned in said center-bore by a press fit, a bell member provided with a flaring mouth and providing an opening in the top smaller in diameter than the diameter of the ball, the bell member having the ball socketed therein with part of the ball and the stem protruding through the opening, said opening allowing the ball to partake of universal motion in the socket of the bell member, and a shoe having a flat bearing surface and a circumscribing flange, and said flange being clinched over the flared mouth of said bell member to retain the ball in the socket and form the glide base for the caster.

5. A glide-type caster comprising a ball having a center-bore, a stem having spiralling external ribs of an outside diameter slightly larger than the diameter of the center-bore, the stem positioned in the center-bore by a press-fit with the ribs scoring the bore and locking the stem to the ball, a bell member provided with a flaring mouth and providing an opening in the top smaller in diameter than the diameter of the ball, the bell member having the ball socketed therein with part of the ball and the stem protruding through the opening, said opening allowing the ball to partake of universal motion in the socket of the bell member, and a shoe having a flat bearing surface and a circumscribing flange, and said flange being clinched over the flared mouth of said bell member to retain the ball in the socket and form the glide base for the caster.

References Cited in the file of this patent

UNITED STATES PATENTS

| | | |
|---|---|---|
| 1,332,605 | Child | Mar. 2, 1920 |
| 1,347,720 | Smith | July 27, 1920 |
| 1,386,959 | Severance et al. | Aug. 9, 1921 |
| 1,734,058 | Sutton | Nov. 5, 1929 |
| 1,844,113 | Beidler et al. | Feb. 9, 1932 |
| 2,262,064 | Swarr | Nov. 11, 1941 |